(12) United States Patent
Baker et al.

(10) Patent No.: US 6,185,591 B1
(45) Date of Patent: Feb. 6, 2001

(54) TEXT EDIT SYSTEM WITH ENHANCED UNDO USER INTERFACE

(75) Inventors: Bruce Raymond Baker; Adrian Storisteanu, both of Toronto (CA)

(73) Assignee: International Business Machines Corp., Armonk, NY (US)

(*) Notice: Under 35 U.S.C. 154(b), the term of this patent shall be extended for 0 days.

(21) Appl. No.: 08/902,148

(22) Filed: Jul. 29, 1997

(51) Int. Cl.[7] .............................. G06F 15/00; G06F 17/00; G06F 17/21; G06F 17/24

(52) U.S. Cl. ........................... 707/531; 707/530; 707/540

(58) Field of Search .................................... 707/531, 540, 707/529, 530, 515; 717/1; 345/439

(56) References Cited

U.S. PATENT DOCUMENTS

| 5,644,692 | * | 7/1997 | Eick .................................... 345/326 |
| 5,802,380 | * | 9/1998 | Bangs et al. ......................... 707/515 |
| 5,990,906 | * | 11/1999 | Hudson et al. ....................... 345/439 |
| 6,026,233 | * | 2/2000 | Shulman et al. ........................ 717/1 |
| 6,026,416 | * | 2/2000 | Kanerva et al. ..................... 707/515 |

OTHER PUBLICATIONS

Quattro Pro Version 3.0 User's Guide, Borland International, pp. 12–17, 30–31, 513–520, 1991.*
WordPerfect User's Guide Version 6.1, Novell Incorporated, pp. 634–635, Oct. 1994.*
Editable graphical histories, Kurlander, D; Feiner, S; IEEE Workshop on Visual Languages, 1988, pp. 127–134, Oct. 1988.*
WordPerfect 6.1 For Wondows For Dummies, 2nd Edition, IDG Books, pp. 23–25, 66, 1994.*

* cited by examiner

Primary Examiner—Stephen S. Hong
Assistant Examiner—William L. Bashore
(74) Attorney, Agent, or Firm—A. Bruce Clay; Myers, Bigel, Sibley & Sajovec, P.A.

(57) ABSTRACT

Present edit systems having undo/redo functions are typically inflexible and do not permit users of computer systems to make use of these functions to the greatest advantage. The disclosed edit system having an enhanced undo interface, permits the selective display of undo elements intermixed in the edit view of the document with actual text elements and positioned relative to the affected text The user may select any undo element and selectively restore changes to the text. A series of user interface enhancements provide the user with a flexible set of capabilities for manipulating and assessing changes to a document.

20 Claims, 6 Drawing Sheets

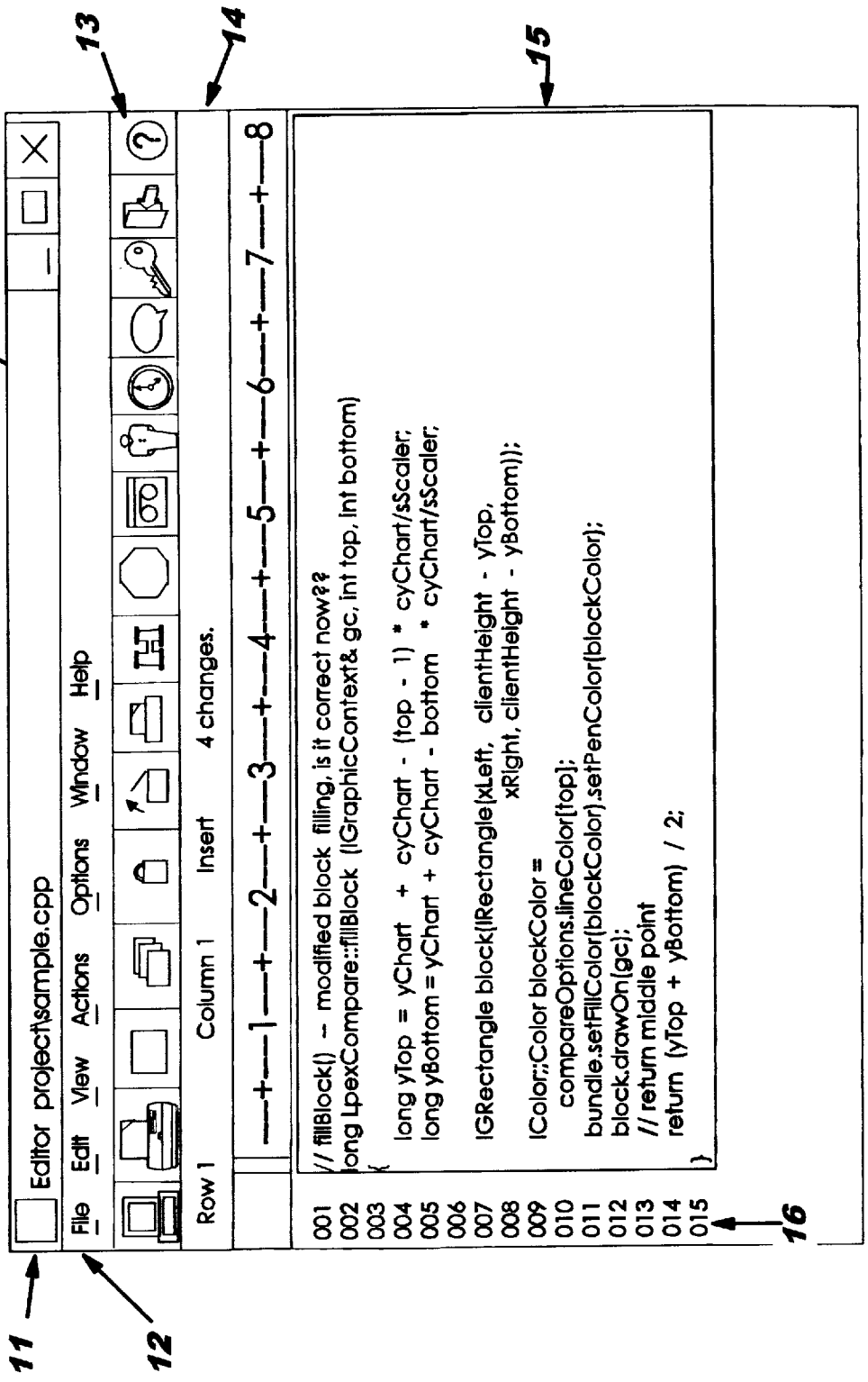

TEXT EDIT SYSTEM WITH ENHANCED UNDO USER INTERFACE

The subject invention relates to computer applications in general and more particularly to improvements in the carrying out and performing editing functions on data in computer systems which include a central processing system, an interactive display terminal and a user input device.

BACKGROUND OF THE INVENTION

The ability of data processing systems to store, retrieve and manipulate data has been well exploited in the fields of text and program processing. Typically, an author uses an interactive display terminal to create a document or file by entering text or data into a data processing system which stores the data in electronic form and displays the text on a display device, such as a cathode ray tube. When the author is satisfied, the text is stored in the form of a file or document in a memory device which may be, for example, a magnetic disk store. In order to change or manipulate the data, the system must be adapted to perform editing functions.

Editor programs are well known in the field of data processing. A file of data, which may hold numerical data, computer programs, or documentation such as text, as well as other information, is created by the user. If it is required to make a change to the file of data, it is necessary to use a program executed on the computer to access and allow the user to effect changes. Thus, editors are known to allow users to work with files and perform such activities as to create files, enter data, manipulate the screen display, make changes to the file, and transfer data between files. Use of editors involves the interactive changing, adding or deleting data from files.

An example of a general text processing editor for use on the Call Management System (CMS) computer environment is the XEDIT program. Details of this program and the functions involved can be found in the XEDIT User's Guide Virtual Machine/Enterprise Systems Architecture, available from International Business Machines Corporation as publication no. SC24-5463. XEDIT is available for use on host computer systems.

A publication describing editors in general, as well as the LEXX editor in particular, is entitled LEXX—A Programmable Structured Editor, by M. F. Cowlishaw, published in the IBM Journal of Research and Development, Volume 31, No. 1, Jan. 1987, pp. 73–80. This paper describes details of aspects and capabilities of various text editors and structured editors. LEXX is a general purpose editor that can edit both documentation and programs while making evident the structure of the data being edited. LEXX is an editor that can be programmed not only to understand and present the structure of data, but also to display those data in a variety of styles and colors in order to best match the data to the user and to the task being performed. The result is a programmable editor that can be customized to suit the data, the task and the needs of the user.

A further development of the LEXX editor that can also be used to create and edit many kinds of data, including programs and documentation, is referred to as the Live Parsing Extensible Editor (LPEX), which runs on workstations. The live parsing capability permits external commands and edit macros attached to the editor to monitor changes made to a document as the user works with and manipulates the document. Details of the LPEX editor can be found in the LPEX User's Guide and Reference Manual, IBM publication no. SC09-2202, available from International Business Machines Corporation.

Text editor applications are continually being improved and made more useful and friendly to the end user. For example, IBM Technical Disclosure Bulletin, Volume 34, No. 7A, Dec. 1991, pp. 20–25, describes a pause review technique for improving the interactivity of direct manipulation in a text editor application. During direct manipulation of a document, a user may be uncertain of the effects of certain changes. This publication describes a technique for providing visual feedback and the effect that the change may have on the document before a direct manipulation is completed. It provides for a conversation-like preview/reject/continue sequence so as to permit the user to actually see what is happening to the document before the changes are finally implemented.

Word processors are application programs for use in personal computer environments and perform similar functions on a document as an editor, including the creating and editing of files. Examples of available word processor applications are WordPerfect™ from Corel Corporation, Amipro™ from Lotus Development Corporation and PFS WindowWorks™ from Softkey International Inc. Typically, user manuals are provided by the respective suppliers or manufacturers of these programs which readily describe the capabilities and functions of the programs.

In general, currently available editors and word processing programs, and in particular the programs referred to above, provide for the functions of making a change to a document or file, such as deleting a word, line or some portion of a file, and providing the capability to recover or "undo" the change that had been originally made in the process of editing the document. Some programs also provide the capability to "redo" a change that was previously undone. It has been found, however, that these capabilities are not sufficient for all editing applications and there is a need for a multi-level, random access undo function, thus providing increased usability. There is a further need for an improved graphical user interface so as to display all changes to a document in their context, and to be able to selectively accept them as desired. Thus, new functions to be implemented in computer programs for editing documents are needed, along with an associated meaningful graphical interface.

Present undo/redo implementations in edit systems provide neither adequate visual feedback of the available undoable changes, nor flexible capabilities to handle these and can be characterized by the following shortcomings or limitations:

the user can only proceed through changes sequentially, from the most recent change backwards, must apply these changes (undo/redo them) while going through the Undo Stack, consequently eliminating from the document edit view the latest, and any other, variant of the affected text;

the user cannot selectively restore part of a global change;

the user cannot see all the text that is going to be restored (e.g., in the case of a global change);

the user cannot see a certain change in the context of the other changes carried out in the course of editing, before undoing it.

This lack of user-friendliness prevents users from using undo/redo functions in complex editing situations where they could be most useful, as the user is virtually operating blindly while doing changes to a document. As a result the user is forced to retype, carefully rescan the document manually while looking for changes, keep and open in the edit system several versions of the document or parts of it for reference, or similar unproductive alternatives, resulting in loss of time and productivity.

SUMMARY OF THE INVENTION

It is an object of the present invention to provide an edit system having an enhanced undo interface which selectively displays undo elements (records), that is, previous states of the document text, intermixed in the edit view of the document with the actual text elements, and positioned relative to the affected text. The invention allows the user to display selected undo elements that belong to one or more undo units (sets, or generations of changes), and selectively restore changes to the text. A series of user interface enhancements comprising visual indications, menu items, and key actions available in the enhanced edit system provide a rich and flexible set of capabilities to the user and to external command/edit macro writers to manipulate changes to the document.

Another object of the invention is to allow the user to view, analyze, select specific undo unit elements and optionally restore changes selectively. For a line that underwent several modifications, the user can select any of those changes to be restored.

It is an object of the invention is to allow a user of an edit system to view and pick partial changes done in the context of a comprehensive (large-scope) document alteration, such as a global "find and replace" operation, and selectively restore the text in order to regress undesired text replaces.

Another object of the invention is that, depending on the particular implementation in the enhanced edit system and the active mode of imbedding undo records, any changes being performed to the document text, including the processing of undo elements, may trigger a refresh of the undo elements imbedded in the document edit view.

Another object of the invention is to display attributes of the undo elements in the edit view such that they are clearly distinguished from the current text elements. The user can navigate easily between the undo elements selected, and zoom-in on one or more types of undo elements selected for display, and then zoom out to the surrounding context.

Another object of the invention is to permit this enhanced undo interface to be implemented in addition to the conventional undo/redo options or commands currently implemented in edit systems. The described method does not affect the basic underlying mechanism of storing undo information in the edit system (either separate structures, or structures intermixed with the text elements), nor the processing of the regular undo/redo operations.

According to one aspect of the present invention, there is provided an improved method implemented in a computer system, for editing a document containing text stored in and displayed by said computer system. The method comprises the steps of displaying the document incorporating a plurality of changes, displaying the document with all of the text along with the plurality of changes, selecting and "undoing" certain of said plurality of changes, and displaying and storing an edited document having certain changes implemented and the selected changes undone so that the resulting document has text corresponding to the undone changes along with the remaining plurality of changes.

According to another aspect of the invention there is provided a programmed computer system to enable a user to edit a document containing text stored in and displayed by said computer system. The programmed computer system comprises means for a user to enter into the computer system a plurality of changes to the text of the document, means for displaying the document with all of the text along with the plurality of changes, means for selecting and undoing certain of said plurality of changes, and means for displaying and storing an edited document having certain changes implemented and the selected changes undone so that the final document has text corresponding to the undone changes along with the remaining plurality of changes.

According to a further aspect of the invention there is provided a computer program product comprising a computer usable medium having computer readable program code means embodied therein for causing the editing of a document containing text, the computer readable program code means in said computer program product comprises computer readable program code means for causing a computer to enter a plurality of changes to the text of the document, computer readable program code means for causing the document to be displayed on a monitor with the text along with the plurality of changes, computer readable program code means, in response to user inputs, for selecting and undoing certain of said plurality of changes, and computer readable program code means for displaying and storing an edited document having certain changes implemented and the selected changes undone so that the document has text corresponding to the undone changes along with the remaining plurality of changes.

BRIEF DESCRIPTION OF THE DRAWINGS

The foregoing and other objects, aspects and advantages of the invention will be better understood from the following detailed description of the preferred embodiment of the invention with reference to the accompanying drawings in which:

FIGS. 1A to 1E is a series of document images on a screen display illustrating a sample application of the invention.

DETAILED DESCRIPTION OF THE PREFERRED EMBODIMENT OF THE INVENTION

The disclosed invention as embodied in a method, computer system and computer program product, is particularly applicable to the live parsing extensible editor (LPEX) environment. Those skilled in the relevant art will appreciate that the invention is also suitable and relevant to various computer system environments, which are appropriately programmed in accordance with the features to be subsequently described, including use in conjunction with host computer systems such as VM/CMS operating systems and personal computer systems such as OS/2®, AIX® and Windows® operating systems.

The edit screen display depicting an application of the subject invention displays requested undo elements or records, intermixed with the affected text elements. User interface components of the screen provide for the selective display of the undo elements of one or more sets of changes to a document and provide for the undo or redo changes to be selectively made to the text.

The present invention may be implemented in a computer application in addition to the regular undo options or commands that are currently implemented, including "undo change" which retrieves and undoes the changes in a most recent-earlier order, and "undo line change" which restores the current edit line of the document to its previous state. The subject invention displays the undo elements or changes intermixed in the edit view of the document on the screen with the affected text elements. It allows the user to view, analyze, select specific undo unit elements, and optionally undo the changes selectively. For a line that underwent several modifications, the user can select any of those changes to be undone. The invention allows the user to view and pick partial changes done in the context of a comprehensive, large-scope document alteration, such as a "global find and replace" operation, and selectively undo text replaces which have subsequently been found to be undesirable, for whatever reason. The invention provides that the display attributes of the undo elements in the edit view clearly distinguish them from the current text elements. The user is able to easily navigate between the undo elements selected and zoom in on all the undo elements selected for display and then zoom out to the surrounding related text.

Figure 1A:
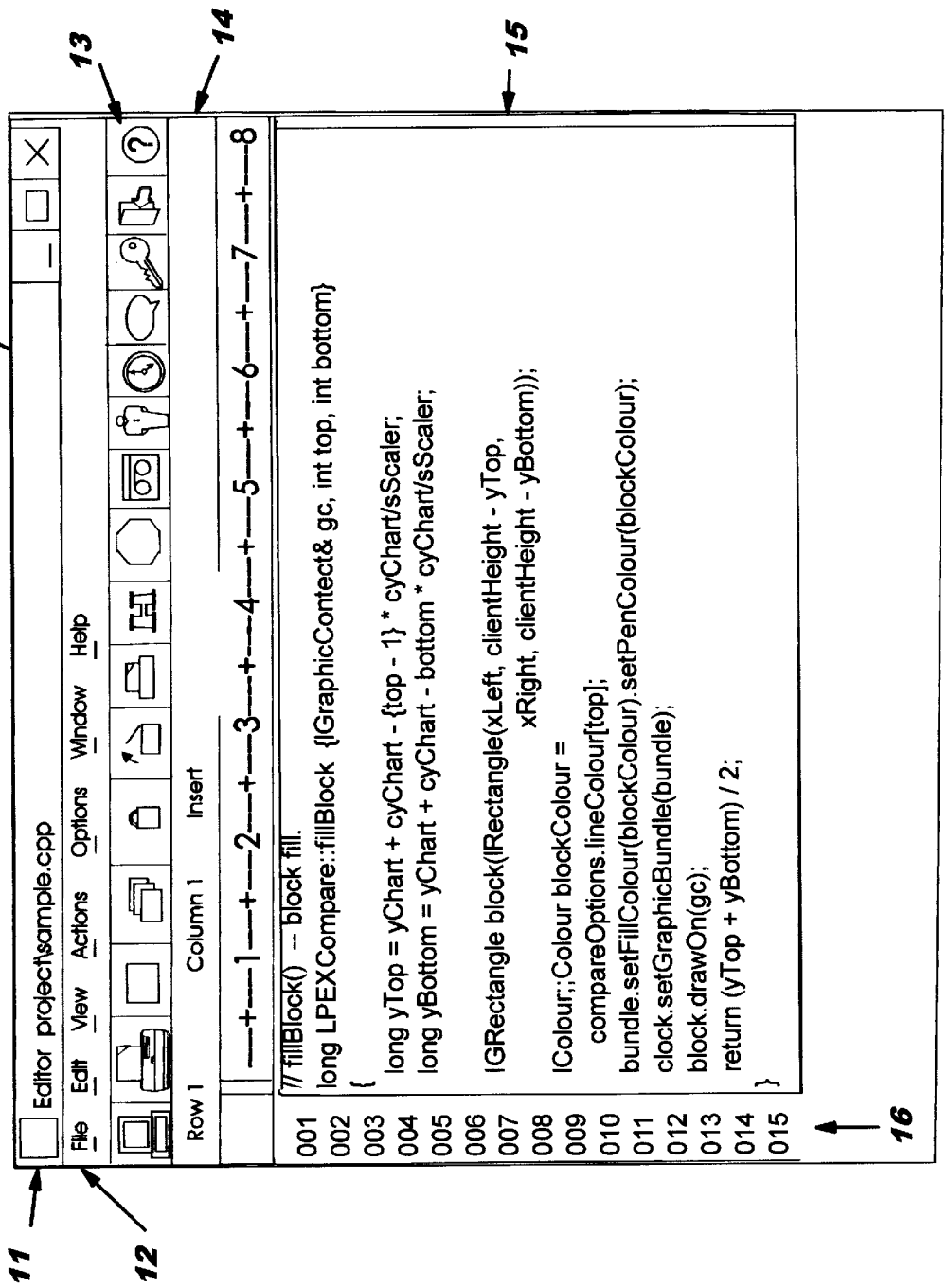

Reference to FIGS. 1A to 1E of the drawings will provide an example of a specific application of the invention. Each of the various screen displays depicted in FIGS. 1A to 1E have the format of a conventional user interface window display, generally indicated by the numeral designation 10, and includes such familiar components as title bar 11, menu bar 12, tool bar 13, status line 14 and document working area generally indicated as 15. FIG. 1A depicts the initial state of a document file which had been previously created and has been opened for editing purposes. This particular file is a C++ program source file. In order to illustrate this sample application of the invention, the user desires to perform the following examples of changes or editing operations on the displayed document:

(A) add a comment before the last line of code (record 014) in order to explain the value returned by the function;

(B) delete the instruction in record 012 which is deemed unnecessary, namely "block.setGraphicBundle(bundle);"

(C) a global find-and-replace of all occurrences of "Colour" to "Color" so that the code conforms to the usage in the C++ libraries; and (D) modify the top comment in record 001 to indicate the changes carried out in the document.

These changes to the document can be entered into the computer and the document in any well known manner such as by use of a keyboard.

The term "record" as used herein refers to the lines or rows of text in the document and these are numbered along the left side of the window display 10 in the prefix area (16), as shown in FIGS. 1A to 1E. With the above described changes entered by the user, the new state of the document incorporating all of the entered plurality of changes is shown in FIG. 1B. It can be seen that the status line 14 in display 10 indicates that four changes were executed in the document, including a global change that affected several records. Thus there are four undo units recorded in the editor software.

The above changes are depicted in FIG. 1B as follows:
Change (A) resulted in a new record 013;
Change (B) resulted in deletion of record 012 from FIG. 1A so that previous record 013 is now record 012 in FIG. 1B;
Change (C) resulted in changes to records 009, 010 and 011; and
Change (D) resulted in a change to record 001.

Figure 1C:
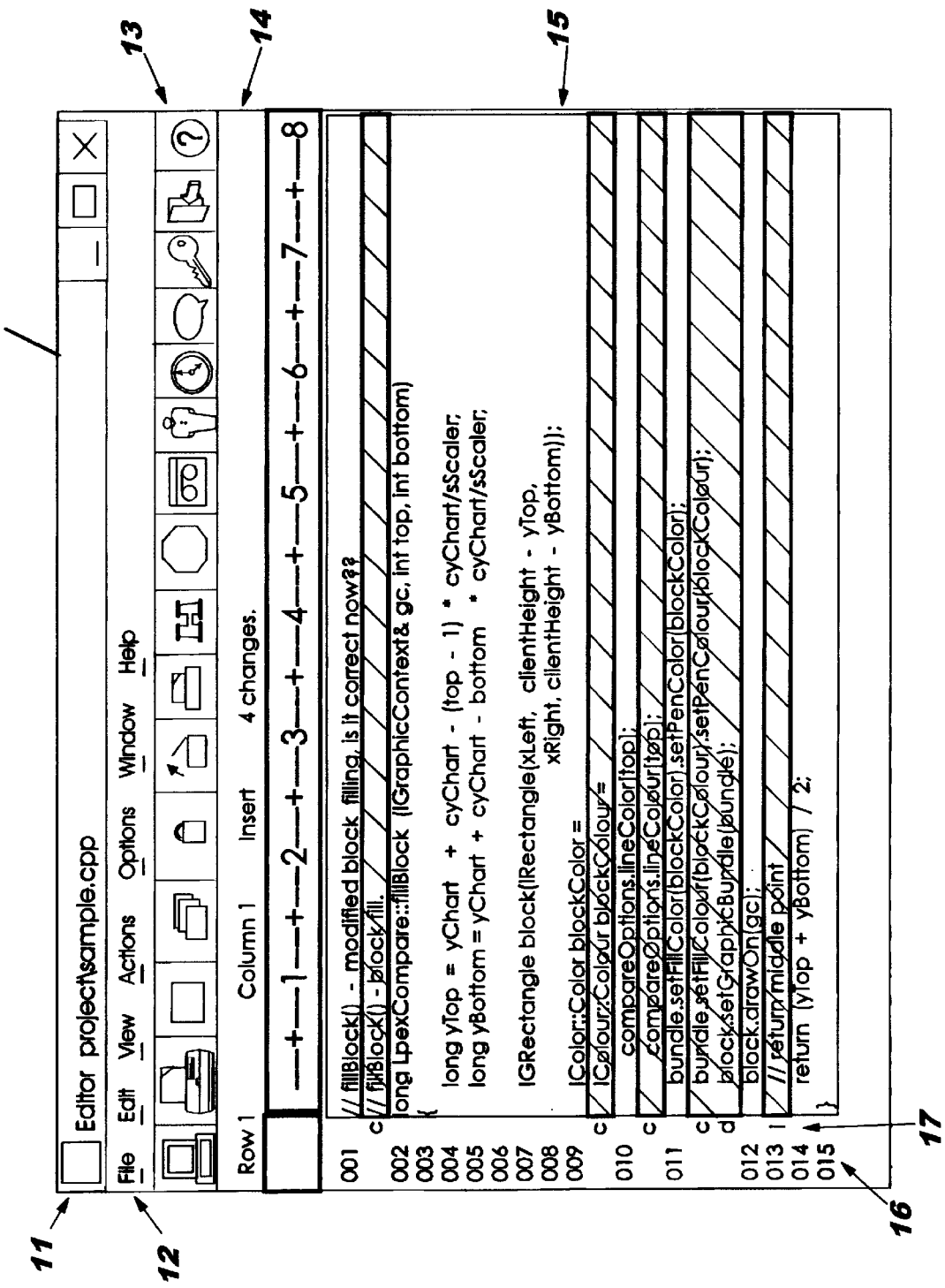

All of the changes to the records are recorded in the edit system, and at this point these can be chosen to be displayed as inserted undo elements. These can be displayed, for example, by selecting a menu option "Show all changes". This results in the screen display as depicted in FIG. 1C. Thus, in FIG. 1C, all of the proposed changes are shown in highlighted format as records following the document text records in which changes have been made. Also shown in FIG. 1C of this example, the editor provides an indication of the type of the undo element shown in the edit view by way of designations in the prefix area towards the left of each record, as shown by reference 17, namely "c" for changed records, "d" for deletions and "i" for insertions. As can be seen, the undo elements are also highlighted in comparison to the text of the document. They generally refer to the text and/or location in the document immediately above or at their position. The changes that would result from their implementation into the text thus become readily apparent.

Figure 1D:
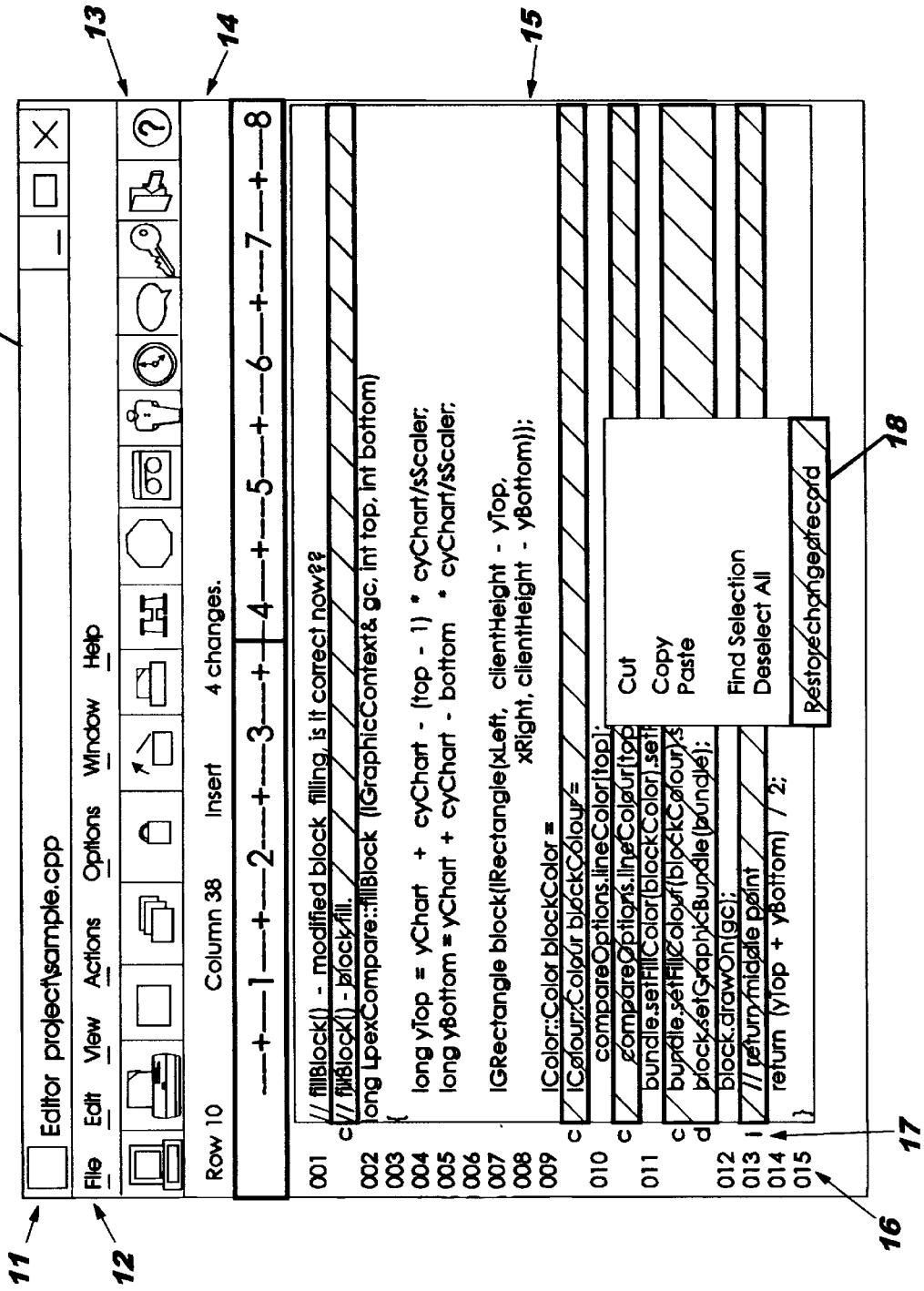

The user now carries out a series of editing operations on the sample document in an effort to arrive at a final document. For the purposes of this example, the processing of undo elements is activated by a double right button mouse click or via a pop-up menu. With reference to FIG. 1D, the user performs the following operations:

Click the right mouse button while pointing the cursor to the change "c" undo element below document record 010. This brings up a pop-up menu 18 with an item "Restore changed record". The user activates this selective record by clicking on it in order to restore the original statement since it was determined that "line-Colour" was incorrectly modified to "lineColor" by the previously indicated global change (C) of "Colour" to "Color";

In a similar manner, for change (B), restore the previously deleted statement by double clicking on the "d" (deletion) undo element above document record 012;

As for change (D), double click on the "c" ("change") element below record 001 so as to restore the original top comment in record 001; and Remove the display of the undo elements from the edit view by activating the appropriate pull-down menu, for example, menu item "Remove all undo elements" in the "Actions" pull-down, and then saving the final edited document.

Figure 1E:
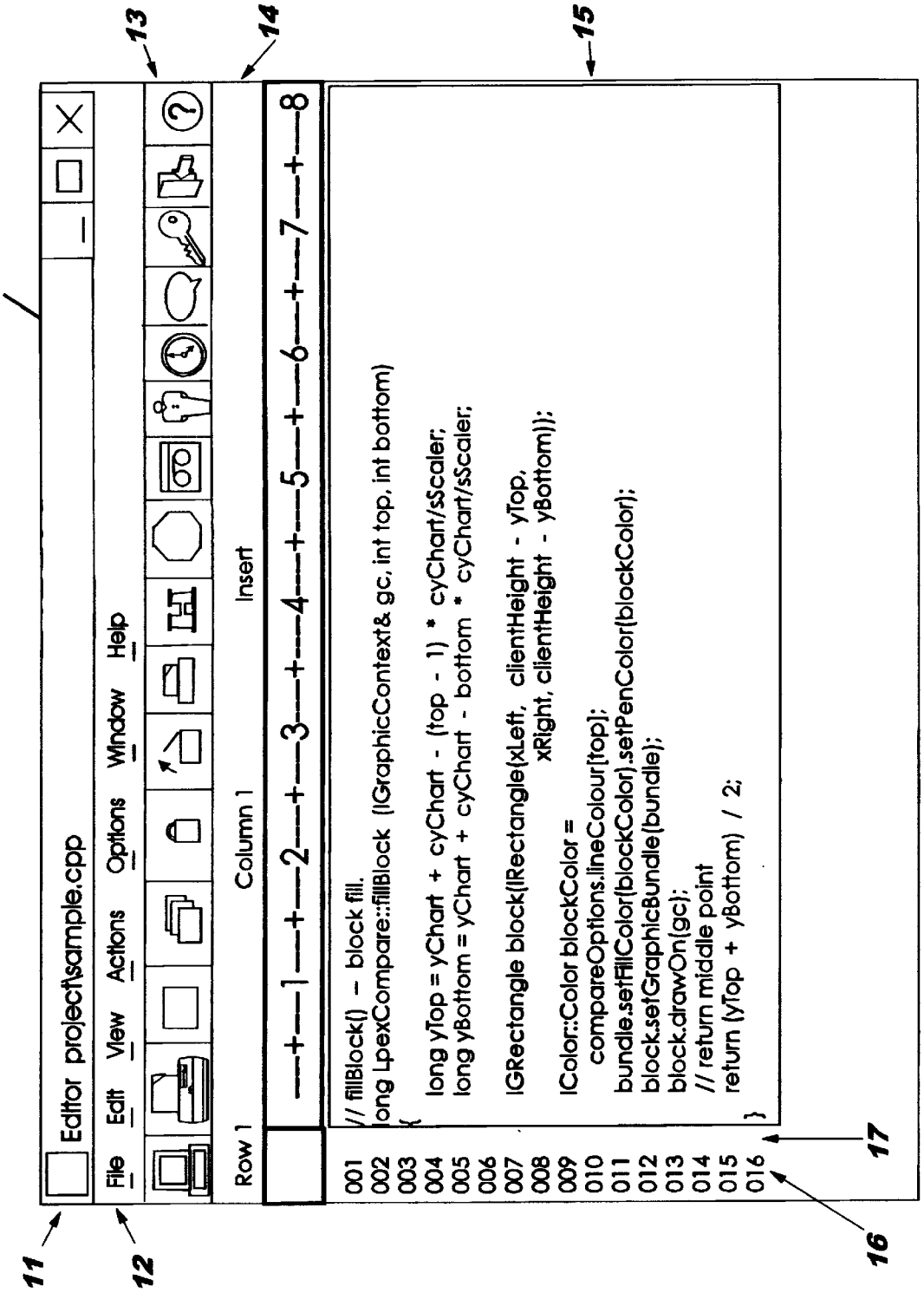

FIG. 1E illustrates the resulting current and final state of the document in the edited view after all of the changes and selected undo elements as described above have been incorporated into the document.

A more detailed description of the implementation of the invention will now be provided. The present invention provides for a set of comprehensive enhancements to the user interface of an edit system for the processing of undo/redo elements, through the imbedding in the document edit view of undo elements intermixed with the document text. These enhancements include:

menu actions;
pop-up menu actions;
key and mouse actions;
font attributes and colors of the undo elements imbedded in the document view in order
 to make them stand out from the regular text,
 to clearly distinguish their type, and
 to highlight a particular generation of changes;
the marking of the undo elements in a separate area of the document view (such as the prefix area);
fly-over help;

context-sensitive help.

One or more of these may be implemented by an edit system which embodies the subject invention. Also, certain capabilities may be made available in the external command/edit macro interface of the edit system, even if not made available in the basic user interface.

Edit System

Figure 2:
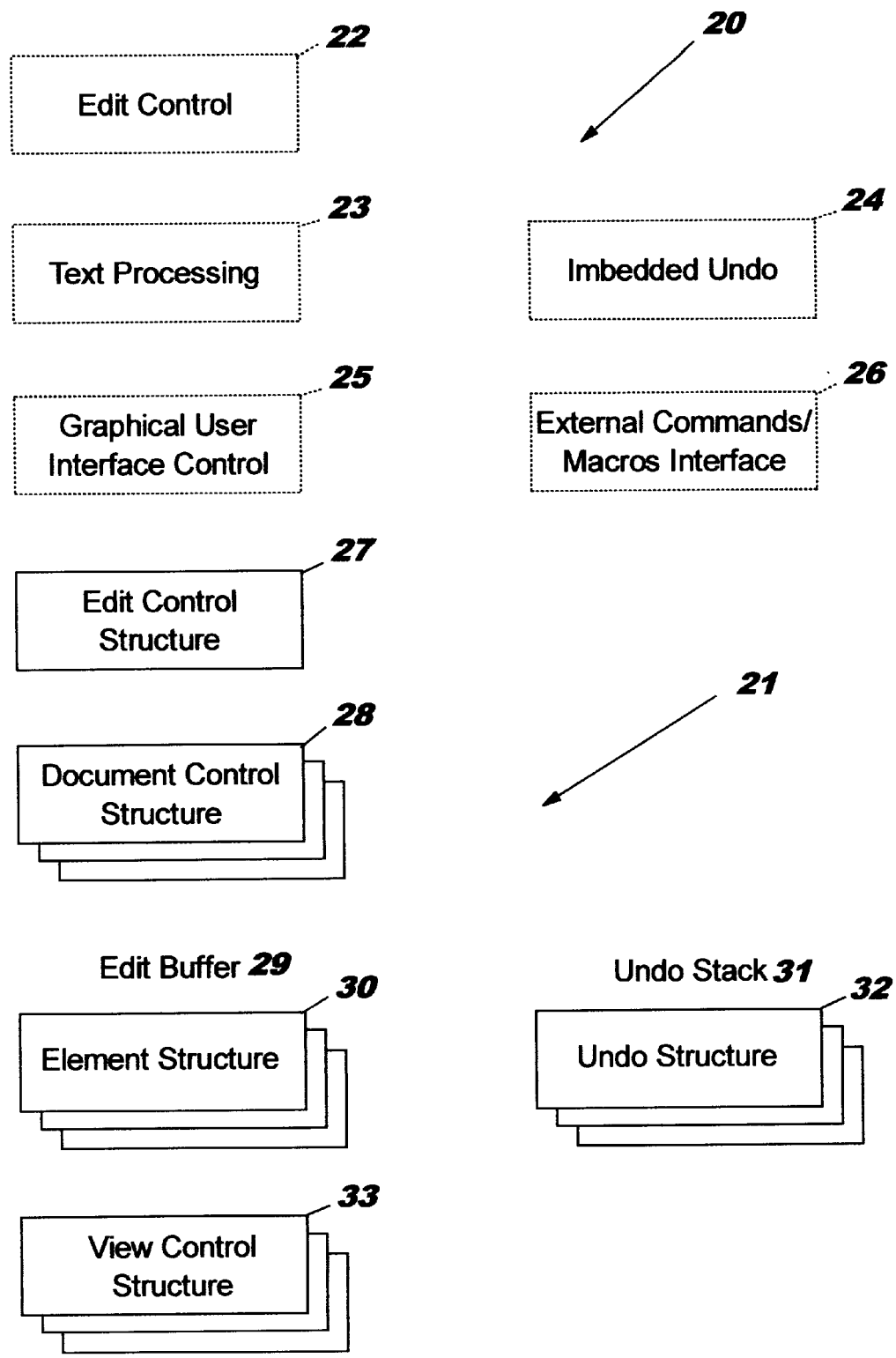
FIG. 2 provides an overview of the main components of an edit system showing the implementation of the invention.

With reference to FIG. 2 of the drawings, an overview of a high-level description of the main components of a typical edit system will be provided with particular reference to the implementation of the subject invention. The blocks shown in FIG. 2 are intended to pictorially represent the functions performed by the code in an edit system to support the subject invention, as well as data structures maintained for the documents being edited. The control code is generally referred to in various blocks in FIG. 2 by reference numeral 20 and the components of the data structures by reference numeral 21. The various components in the edit system will now be briefly described to the extent needed to provide a context for the subject invention.

Dealing first with the components of control code 20, Edit Control 22 is responsible for the instantiation and management of the various components of the edit system. It processes the edit system internal commands. It handles the binding of internal commands or external commands and edit macros to menu items, key actions, mouse actions, etc. When an action is received, it invokes the command bound to it (if any).

Text Processing component 23 handles the loading of documents into the Edit Buffer 29 of the edit system, all the text editing operations and the formatting of the text, and the saving of the document. It records changes to the document in the Undo Stack 31 for subsequent undo and redo. Edit Buffer 29 and Undo Stack 31 temporarily store the documents and changes to the documents during processing.

Imbedded Undo 24 handles the imbedding, removal, and processing of undo elements in the document edit view. This is the component of the edit system by which the main aspects of the subject invention will be implemented as will be more fully described.

The Graphical User Interface control 25 controls the document edit view and builds and renders the edit view. Interface control 25 manages the display attributes of the rendered elements. It can show the document Edit Buffer 29 selectively (zoom in/out), by only including in the view those elements whose visibility matches the current settings.

External Commands/Macros Interface 26 controls the interface to external commands and edit macros, including live (incremental) parsers. Interface 26 loads and runs external commands and macros. It records committed changes into a stack for subsequent processing by any live parser attached to the edit system.

As part of the data structure 21 of the edit system, edit control structure 27 represents the global data for controlling the edit system. Document control structure 28 contains information to control the operations on a document in the edit system, and as is illustrated pictorially in FIG. 2, there are a plurality of these controls created, one for each document. Edit buffer 29 comprises a linked list of all the elements for a particular document as further described with reference to element structure 30. Classes are defined for a document, that broadly classify element types in the document. Classes are used to filter out elements from the view, and are used by the parsers or external commands to interpret the edit buffer on contents at various degree of detail. Each element can belong to one or more classes.

Element structure 30 represents the elements that make up the edit buffer 29 and include TEXT elements, SHOW elements and the combination of TEXT and SHOW elements. TEXT elements are the contents of the document loaded in the edit system. The display attributes for each character are usually set by the tokenizer of a live parser attached to the edit system. SHOW elements are the elements that are created for the purpose of display only: error and status messages, imbedded undo records. The display attributes are set separately for SHOW elements. They are protected from regular editing, and are not saved into the document file. For a combination of TEXT and SHOW elements, the SHOW display attributes take precedence, but the element may be edited and it is saved in the document. An element structure contains the text contents the corresponding prefix area contents formatting flags and display attributes the type (e.g., TYPE_DELETION for an imbedded DELETION undo SHOW element)

class information.

Undo structure 32 within Undo Stack 31 consists of a linked list of undo records created as changes take place to the document during the edit session, while undo recording is enabled. There is a structure 32 for each document being processed in the edit system. The information stored depends on the type of change, and the particular edit system. Undo records are of three basic types:

INSERTION—records the insertion of elements in the Edit Buffer

DELETION—records the deletion of elements

CHANGE—records changes to the contents of the document.

Complex operations will create a series of the above undo records. For example, a block move will create a series of DELETION and INSERTION undo records that all belong to one undo unit. An undo unit records a set (generation) of changes in the document. It comprises all the data necessary to undo an entire edit operation performed on the text, from one character change in one text record, to all the changes done in the context of one global change operation.

View control structure 33 comprises data related to the control of an edit view for one document in an edit system window and includes fonts defined for the view, view's size, format of its displayed prefix area, the required visibility of elements (for filtering/zooming in), screen fields for the document view consisting of the particular area of the edit buffer that displays.

It is believed that the above descriptions of the components of the control code and data structures of an edit system provides sufficient understanding for one skilled in the art of edit systems to be able to fully appreciate further aspects of the implementation of the invention which will now be described.

Imbedding Undo Elements

In an edit system which embodies the subject invention there are several ways to display undo elements in the edit view of the document, provided by menu items and/or in the undo dialog (panel) that cycles through the modifications performed to the document contents. They allow the user a choice of options to view, in the context of the current state of the document, certain sets of changes that were carried out in the edit session and consist of:

Show all changes—imbeds all the stored undo elements (the entire Undo Stack) to the edit view of the document. The latest undo unit displays with highlighted attributes.

Show changes for line—imbeds all the stored undo elements that refer to the line on which the cursor (entry point) is positioned.

Show/hide undo unit—incrementally adds or removes a single undo unit, as the user cycles through the changes via the undo/redo dialog or menu items. The latest undo unit displays with highlighted attributes.

In accordance with the present invention, the views of a document for which undo elements are shown in an edit system, have several of their menus and actions in the menu bar or tool bar respectively, updated with options to embed and manipulate imbedded undo elements.

(1) "Actions" menu options to process the imbedded undo elements include:

Select all undo elements
    Deselect all undo elements
    Restore selected undo elements
    Remove selected undo elements
    Remove all undo elements Select all undo elements—selects for subsequent processing all the undo elements imbedded in the document view. The user may then deselect particular undo elements.
Deselect all undo elements—deselects all the imbedded undo elements.
Restore selected undo elements—processes all the imbedded undo elements currently selected in the document view. This restores changes to the affected current document text.
Remove selected undo elements—removes from the document view all the selected imbedded undo elements. This does not affect the contents of the document.
Remove all undo elements—removes all the imbedded undo elements from the document view, which is then restored to its previous state—undo elements-related menus are removed, action keys restored, etc. This option does not affect the contents of the document.

(2) "View" menu options to filter (zoom-in on) the imbedded undo elements include:

Insertions
    Deletions
    Changes

Insertions—only display INSERTION imbedded undo elements.
Deletions—only display DELETION imbedded undo elements.
Changes—only display CHANGE imbedded undo elements.

When activating one or more of these choices, the document view is collapsed to only display undo elements, and only of the selected type(s) (if there are any). The user is shown an overview of the particular changes carried out on the document in the edit session. The user can move the cursor (insertion point) to a particular imbedded undo element and zoom-out (restore normal display of the entire document and all the imbedded undo elements) for the context of the change.

(3) "Locate" (sub)menu options to navigate between the imbedded undo elements include:

Edit
        Locate
            Next undo element
            Previous undo element Next undo element—move cursor to the next imbedded undo element (if any) in the document edit view.
Previous undo element—move cursor to the previous imbedded undo element (if any).

Accelerators are also set up by the invention for selected menu options, and other key combinations can be set up to process individual undo elements. For example, double-clicking with the mouse on an undo element in a view of such a document will be set to process it (i.e., restore the particular change to the text).

Similarly, fly-over help for additional information when the cursor hovers over imbedded undo elements (e.g., showing the type of change indicated by the particular undo element); any prefix area of each record in the edit view is enlarged to accommodate an indication as to the type of the imbedded undo elements; appropriate menu items are added to the document edit views pop-up menu (e.g., for the particular imbedded undo element at the cursor, for its processing, for general and particular help on imbedded undo elements); context-sensitive help is upgraded to present help on undo elements.

Imbedded Undo Elements in the Edit System

The invention provides that undo elements are inserted into the edit view as special lines, assigned the SHOW display and edit attributes, and set the edit system class UNDO. These elements are protected from regular editing and are not regularly saved with the file.

An element that is both a regular TEXT and a SHOW element (for imbedded undo elements of type INSERTION), is treated appropriately as either TEXT or SHOW, depending on the edit system function handling it. Such an element will display with SHOW display attributes, but will be saved normally with the rest of the document, and will not be read-only (protected from editing).

The running row number displayed on the status line in a conventional edit system, and queriable by external commands and macros, is not directly affected in the existing interface. Therefore, the user still refers to records in the document text by their real record numbers, and the external "view" of the document seen by an external command/edit macro through the existing interface is not affected.

The edit system UNDO class also allows external commands or tools attached to the edit system to distinguish the undo elements from regular text, and optionally process them.

Imbedded undo elements, like the undo records saved by the edit system in the course of the edit session, are of three types, depending on the type of text modification represented:

INSERTION
    DELETION
    CHANGE.

This undo type indication is stored in the imbedded undo elements, via three corresponding flag bits, which may appear in combination in certain cases:

TYPE_INSERTION
    TYPE_DELETION
    TYPE_CHANGE.

An undo element in the view of a document is displayed differently from the regular text elements, so that it is easily visible in the file. The type of undo element is reflected in the foreground and background colors, and attributes (e.g. bold, italics) of the (user-settable) display fonts:

FONT_INSERTION
    FONT_DELETION
    FONT_CHANGE.

A particular generation of changes, usually the latest added to the view or processed, is reflected in a variation to the display attributes (e.g., a different nuance of the colors above, and/or the addition of the bold attribute) to the imbedded undo elements it comprises:

FONTHIGHLIGHT_INSERTION
    FONTHIGHLIGHT_DELETION

FONTHIGHLIGHT_CHANGE.

Each undo element refers:

to the text or undo element immediately above it;

to the text element to which it belongs, in the case of INSERTION undo elements; or to the location in the document immediately above it, in the case of DELETION undo elements.

The "View" menu is updated to provide zoom-in on the undo elements. This is achieved by setting a view visibility parameter to the UNDO edit system class, which in combination with the type of the undo element will exclude from the display all the elements for which the UNDO edit system class is not set, and all the undo elements of other types. Other menu items, key actions, mouse actions, etc. are set for the document edit view showing imbedded undo elements.

The new menu items and key combinations are set via the regular edit system interface to add menu items and accelerators, to set/reset action keys, etc.

Now that an overview and functional aspects of the subject invention have been introduced and described, pseudo code will now be presented and described for implementing the functions and routines of the subject invention into the edit view of an edit system under the topic headings of (1) Imbedding Undo Elements, (2) Removing Imbedded Undo Elements, (3) Processing Imbedded Undo Elements, and (4) Other Routines. Terms used in this description have been previously introduced and described.

(1) Imbedding Undo Elements

AddAllUndoUnits—ADD ALL UNDO UNITS

This routine adds all of the undo elements that comprise the Undo Stack, to the edit view of the document.

clear all existing imbedded undo elements for all undo records in the Undo Stack
      if in most recent undo unit
        AddUndoElement—ADD UNDO ELEMENT (highlight)
      else
        AddUndoElement—ADD UNDO ELEMENT
    rebuild view and refresh display AddLineUndo—ADD ALL UNDO ELEMENTS FOR A TEXT LINE This routine adds all of the undo elements that refer to a particular existing line of text, to the edit view of the document.

remove all existing imbedded undo records for text line
      for all undo records in the Undo Stack
      if undo record refers to current text line
        AddUndoElement—ADD UNDO ELEMENT
    rebuild view and refresh display AddUndoUnit—ADD UNDO UNIT This routine adds the undo elements that comprise one particular undo unit, to the edit view of the document. The routine first scans the document view for previously-imbedded undo elements, and changes their highlight to that defined for older generations of undo (1) Imbedding Undo Elements AddAllUndoUnits—ADD ALL UNDO UNITS This routine adds all of the undo elements that comprise the Undo Stack, to the edit view of the document.

clear all existing imbedded undo elements for all undo records in the Undo Stack
      if in most recent undo unit
        AddUndoElement—ADD UNDO ELEMENT (highlight)
      else
        AddUndoElement—ADD UNDO ELEMENT
    rebuild view and refresh display AddLineUndo—ADD ALL UNDO ELEMENTS FOR A TEXT LINE This routine adds all of the undo elements that refer to a particular existing line of text, to the edit view of the document.

remove all existing imbedded undo records for text line
      for all undo records in the Undo Stack
      if undo record refers to current text line
        AddUndoElement—ADD UNDO ELEMENT
    rebuild view and refresh display AddUndoUnit—ADD UNDO UNIT This routine adds the undo elements that comprise one particular undo unit, to the edit view of the document. The routine first scans the document view for previously-imbedded undo elements, and changes their highlight to that defined for older generations of undo elements. It then iteratively invokes the function to add an undo element for all the undo elements that comprise the undo unit. Finally, the screen is rebuilt and refreshed.

ResetUndoHighlight—UNHIGHLIGHT VIEW'S UNDO ELEMENTS for all undo elements in an undo unit
        AddUndoElement—ADD AN UNDO ELEMENT (highlight)
    rebuild view and refresh display AddUndoElement—ADD UNDO ELEMENT This routine adds one undo element to the edit view of a document. An optional highlight parameter, is used to highlight undo elements recently added or that belong to a particular (e.g., latest) undo unit. Processing here depends on the type of the undo record in the Undo Stack.

The undo element is imbedded at a location in the Edit Buffer determined by the undo record in the Undo Stack, and its type. This is the location of the text element for an INSERTION undo record, the location after the text element for a CHANGE undo record, or the location that the undo record refers to for a DELETION undo record. Further, this location is adjusted to point in between any previously imbedded undo elements for the referenced document text or location.

Parser trigger recording of committed changes is disabled during the insertion of undo elements. The insertion is not recorded in the Undo Stack of the document either.

When the user edits a document text element that is also marked as an INSERTION imbedded undo element, beginning to type the modification opens a new undo unit in the edit system Undo Stack, which in turn may trigger an automatic refresh of the imbedded undo elements (in this example, a CHANGE undo element is added that contains the current text element before the change). This behavior depends on the particular implementation in the edit system and the active mode of imbedding undo records.

save original state of parser trigger recording
    disable parser trigger recording
    disable undo recording
    if class UNDO not defined for context document
    InitializeViewForUndo—SET UP VIEW FOR UNDO ELEMENTS
    if INSERTION undo record
      determine and set the Edit Buffer location at the text element that the insertion undo record refers to
      type bits=TYPE_INSERTION
      append to its formatting attributes the SHOW display attributes
      if highlight

```
        set FONTHIGHLIGHT_INSERTION
    else
        set FONT_INSERTION
else if DELETION undo record
    determine and set Edit Buffer location at the location that
        the deletion undo record refers to
    if any other undo element at this location reposition
        according to sequence of changes in Undo Stack
    insert undo element
    type bits=TYPE_DELETION
    set its formatting attributes to SHOW attributes
    if highlight
        set FONTHIGHLIGHT_DELETION
    else
        set FONT_DELETION
else /* i.e., CHANGE undo record */
    determine and set Edit Buffer location following the text
        that the change undo record refers to
    if any other undo element at this location
        reposition according to sequence of changes in Undo
            Stack
    if element at this location is not a TYPE_INSERTION
        imbedded undo element
        insert undo element
    if element also indicates an INSERTION undo
        set type bits=TYPE_INSERTION+TYPE_CHANGE
    else
        type bits=TYPE_CHANGE
    set its formatting attributes to SHOW attributes
    if highlight
        set FONTHIGHLIGHT_CHANGE
    else
        set FONT_CHANGE
append class UNDO to the element's class bits
set type indication in prefix area
re-enable undo recording
restore original state of parser trigger recording
if not called from another undo function
    rebuild view and refresh display
InitializeViewForUndo—Set Up View for Undo Elements
```

This routine prepares the document edit view for undo elements to be imbedded and is called when the first undo element is being added to the edit view. The routine defines a new UNDO class in the document scope to identify the undo elements for processing. It adds new menu items (and their accelerator keys) and corresponding action bindings to the current edit view, to allow user to view, navigate, process, and remove imbedded undo elements.

```
    add class UNDO to document's defined classes
    add "Select all undo elements"
    menu item and accelerator to the "Actions" pull-down,
        and
    bind it to edit system's command SelectAllUndo
    add "Deselect all undo elements"
    menu item and accelerator to the "Actions" pull-down,
        and
    bind it to edit system's command DeselectAllUndo
    add "Restore selected undo elements"
    menu item and accelerator to the "Actions" pull-down,
        and
    bind it to edit system's command RestoreSelectedUndo
    add "Remove selected undo elements"
    menu item and accelerator to the "Actions" pull-down,
        and
    bind it to edit system's command RemoveSelectedUndo
    add "Remove all undo elements"
    menu item and accelerator to the "Actions" pull-down,
        and
    bind it to edit system's command RemoveAllUndo
    add "Insertions"
    menu item and accelerator to the "View" pull-down, and
    bind it to edit system's command ZoomonUndo TYPE_
        INSERTION
    add "Deletions"
    menu item and accelerator to the "View" pull-down, and
    bind it to edit system's command ZoomOnUndo TYPE_
        DELETION
    add "Changes"
    menu item and accelerator to the "View" pull-down, and
    bind it to edit system's command ZoomOnUndo TYPE_
        CHANGE
    add "Next undo element"
    menu item and accelerator to the "Locate" (sub)menu, and
    bind it to edit system's command NextUndoElement
    add "Previous undo element"
    menu item and accelerator to the "Locate" (sub)menu, and
    bind it to edit system's command PreviousUndoElement
    bind mouse actions to RestoreUndoElement
    set-up fly-over help for imbedded undo elements
    set-up prefix area for indication of type of imbedded undo
        element
    add call to PopupUndo to edit view's popup initialization
        binding
    add call to HelpUndo to the current contextual-help key
        binding
    define the FONT_xxx and FONTHIGHLIGHT_xxx dis-
        play attributes
ResetUndoHighlight—Unhighlight View's Undo Elements
```

This routine restores the regular display attributes of the imbedded undo elements in the document view.

```
    for all elements in document
        if UNDO element
            if FONTHIGHLIGHT_xxx
                set corresponding FONT_xxx
    if not called from another undo function
        rebuild view and refresh display
```

(2) Removing Imbedded Undo Elements

The routines below handles the removal of imbedded undo elements in a document from the document edit view.

Parser trigger recording is disabled during the removal of undo elements, in order to prevent unnecessarily triggering external live parsers during this operation. The resulting change to the Edit Buffer is not recorded in the Undo Stack of the document either.

When the request to remove imbedded undo elements comes from a live parser attached to the edit system for the document, the selected imbedded undo elements are not immediately removed from the Edit Buffer, but are instead just marked for deletion. They will be actually deleted from the Edit Buffer following the call return from the live parser/external command, after all the pending lines have been processed by the said parser. This ensures edit buffer—parser synchronization, as otherwise the parse range initially determined by the parser would be continuously altered by the deletion of the undo elements.

RemoveAllUndo—Remove All Undo Elements

This routine removes all the imbedded undo elements from the document edit view, and restores its original state (undoes the changes performed in InitializeViewForUndo).

```
    for all elements in document
``` if undo element
 RemoveUndoElement—REMOVE UNDO ELEMENT
 remove class UNDO from document's defined classes
 remove class UNDO from the editing-protection selection
 remove "Select all undo elements", "Deselect all undo elements",
  "Restore selected undo elements", "Remove selected undo elements", and "Remove all undo elements" menu items and accelerators from the "Actions" pull-down
 remove "Insertions", "Deletions", and "Changes" menu items and accelerators from the "View" pull-down
 remove "Next undo element" and "Previous undo element" menu items and accelerators from the "Locate" (sub)menu
  restore modified mouse actions
  remove fly-over help for imbedded undo elements
  restore prefix area format
  remove call to PopupUndo from edit view's popup initialization binding
  remove call to HelpUndo from the current contextual-help key binding
  rebuild view and refresh display
RemoveSelectedUndo—Remove A Selection of Undo Elements
 This routine removes the selected imbedded undo elements from the edit view document.
 for all selected elements in document
 if undo element
  RemoveUndoElement—REMOVE UNDO ELEMENT
 rebuild view and refresh display
RemoveUndoElement—Remove Undo Element
 This routine removes the specified imbedded undo element from the edit view document. Usually this is invoked by a higher-level function that either removes a processed undo element, or all those imbedded undo elements in the document view that belong to one particular undo unit, or that are of a certain type. If both TYPE_CHANGE and TYPE_INSERTION flag bits are set, the undo element will be treated as a CHANGE one. CHANGE and DELETION undo elements are deleted. An INSERTION undo element is restored to be a regular text element.
 save original state of parser trigger recording
 disable parser trigger recording
 disable undo recording
 if TYPE DELETION or TYPE_CHANGE flag bit set
  delete the element
 else if TYPE_INSERTION flag bit set
 /* i.e., here not both TYPE_CHANGE+TYPE_INSERTION flag bits set */
  remove the SHOW formatting attributes
  drop class UNDO from the element
  clear undo element type indication from prefix area
  re-enable undo recording
  restore original state of parser trigger recording
  if not called from another undo function
   rebuild view and refresh display
(3) Processing Imbedded Undo Elements
RestoreSelectedUndo—Process A Selection of Undo Elements
 This routine restores the changes indicated by the selected imbedded undo elements. Where several selected imbedded undo records refer to changes to the same text element, only the most recent change is restored.
 for all selected elements in document
 if undo element
  RestoreUndoElement—RESTORE UNDO ELEMENT
 rebuild view and refresh display
RestoreUndoElement—Restore Undo Element
 This routine restores the referenced text element or location in the document, according to the type of the imbedded undo element, effectively undoing the particular change. The text element is restored, and the currently affected text is added to the undo buffer in the regular manner. Note that processing an imbedded undo record in this manner is not a regular undo action, but rather a new change to the document. It gets added into the Undo Stack of the document like any other text change.
 The document edit view must now be updated in order to display the current state of the imbedded undo elements that presently refer to this text. Depending of the active mode of imbedding undo elements and the particular edit system implementation, the imbedded undo elements in the document edit view may be updated automatically as a result of restoring the undo element.
 if undo element
  if TYPE_CHANGE flag bit set
   change referenced element with contents (text, prefix area, etc.) of the undo element
   remove the processed undo element
  else if TYPE_INSERTION flag bit set
  /* i.e.here not both TYPE_CHANGE+TYPE_INSERTION flag bits set */
   make referenced element a regular text element (drop anything that has to do with imbedded undo record and SHOW element)
  else /* i.e., TYPE_DELETION flag bit set */
   insert an element at the referenced location with contents (text, prefix area, etc.) of the undo element
   remove the processed undo element
  rebuild view and refresh display
(4) Other Functions
NextUndoElement—Go to the Next Imbedded Undo Element
 This routine moves the cursor position to the next (if any) undo element imbedded in the document edit view.
 from current cursor position to end of document
 if an undo element
  move cursor to this element
  rebuild view and refresh display
PreviousUndoElement—Go to the Previous Imbedded Undo Element
 This routine moves the cursor position the previous (if any) undo element imbedded in the document edit view.
 from current cursor position to start of document
 if an undo element
  move cursor to this element
  rebuild view and refresh display
HelpUndo—Give Help for Imbedded Undo Element
 This routine provides general help about undo elements and specific help for the type of undo element.
 if cursor located on an undo element
  if help for type of undo registered with the edit system
   create help instance
   invoke help display
   return
 run original command bound to the contextual-help key
ZoomOnUndo—Zoom in on Imbedded Undo Elements
 This routine zooms in on (filters) undo elements in the document edit view. A parameter indicates what type(s) of undo elements should be toggled, added to, or removed from the display: INSERTION, DELETION, or CHANGE.

When the document view screen fields are built, their visibility and, accordingly, their inclusion or exclusion from the current view, is determined based on their type, and the type(s) selected to display. ZoomOnUndo routine sets the new desired visibility flags, then calls to rebuild the view and refresh the display.

SelectAllUndo—Select All Undo Elements

The routine selects all the undo elements in the document edit view.

for all elements in document
      if undo element
        select element

DeselectAllUndo—Deselect All Undo Elements

This routine deselects all the undo elements in the document edit view.

for all elements in document
      if undo element
        deselect element

PopupUndo—Initialize Popup Menu

This routine adds any menu items related to imbedded undo elements to a popup window ready to display. If both TYPE_CHANGE and TYPE_INSERTION flag bits are set, the undo element will be treated as a CHANGE one.

if cursor on undo element
      add "Remove undo element" menu item, and
      bind it to edit system's command RemoveUndoElement
      if TYPE_CHANGE flag bit set
        add "Restore changed record" menu item, and
        bind it to edit system's command RestoreUndoElement
      if TYPE_INSERTION flag bit set
        add "Restore inserted record" menu item, and
        bind it to edit system's command RestoreUndoElement
      else /* i.e., TYPE_DELETION flag bit set */
        add "Restore deleted record" menu item, and
        bind it to edit system's command RestoreUndoElement From the provisions of the above pseudo code and accompanying descriptions, the building, developing and creating actual code to implement the previously described routines and functions in an edit system in order to carry out the subject invention is believed to be well within the skill and abilities of a competent programmer and particularly one familiar with edit systems.

It should be readily understood that the foregoing description is only illustrative of the invention and in particular is only a preferred embodiment of the invention. Various alternatives and modifications can be devised by those skilled in the art without departing from the spirit of the invention. Accordingly, the present invention is intended to embrace all such alternatives, modifications and variations which fall within the scope of the appended claims.

What is claimed is:

1. An improved method implemented in a programmed computer system for editing a document containing initial text stored in and displayed by said computer system, comprising the steps of:

displaying the document;

accepting user input to define a sequence of changes to the initial text of the document;

obtaining user input so as to select a subset of the sequence of changes to the text of the document;

displaying the document with said subset of the sequence of changes;

selecting and undoing changes in the subset of the sequence of changes irrespective of the sequence in which the changes to the initial text of the document were made;

implementing changes in the sequence of changes which are not selected and undone to provide an edited document; and displaying and storing the edited document and the selected changes undone so that the stored document has text corresponding to the undone changes along with the remaining sequence of changes.

2. The method as described in claim 1 wherein the step of selecting and undoing changes in the subset of the sequence of changes results in at least one of said changes being undone.

3. The method as described in claim 1 wherein said selected ones of the sequence of changes to the document are displayed in highlighted format in comparison to the initial text of the document.

4. A method according to claim 1, wherein the subset of the sequence of changes comprise changes associated with a cursor location in the document.

5. A method according to claim 1, wherein the subset of the sequence of changes comprise all of the sequence of changes.

6. A method according to claim 1, wherein the subset of the sequence of changes comprise changes having a common undo type.

7. A method according to claim 6, wherein the undo types are selected from the group comprising insertion changes, deletion changes and change changes.

8. A method according to claim 6, wherein the step of obtaining user input so as to selects a subset of the sequence of changes to the text of the document comprises the steps of:

obtaining user input as to a common undo type; and selecting all of the changes in the sequence of changes having the common undo type.

9. A programmed computer system to enable a user to edit a document containing initial text stored in and displayed by said computer system, comprising:

means for a user to enter into the computer system a plurality of changes to the initial text of the document so as to provide a sequence of changes;

means for selecting a subset of the sequence of changes;

means for displaying the document with the subset of the sequence of changes;

means for selecting and undoing changes in the subset of the sequence of changes irrespective of the sequence in which the changes to the initial text of the document were made;

means for implementing changes in the sequence of changes which are not selected and undone so as to provide an edited document; and means for displaying and storing the edited document and the selected changes undone so that the stored document includes text corresponding to the undone changes along with the remaining plurality of changes.

10. A system according to claim 5, wherein the subset of the sequence of changes comprise changes from a generation of changes.

11. A system according to claim 5, wherein the subset of the sequence of changes comprise changes associated with a cursor location in the document.

12. A system according to claim 5, wherein the subset of the sequence of changes comprise changes having a common undo type.

13. A method according to claim 12, wherein the undo types are selected from the groups comprising insertion changes, deletion changes and change changes.

14. A method according to claim 12, wherein the means for selecting a subset of the sequence of changes comprises:

means for obtaining user input as to a common undo type; and means for selecting all of the changes in the sequence of changes having the common undo type.

15. A computer program product comprising:

a computer usable medium having computer readable program code means embodied therein for causing the editing of a document containing initial text, the computer readable program code means in said computer program product comprising:

computer readable program code means for causing a computer to enter a plurality of changes to the initial text of the document so as to provide a sequence of changes to the document;

computer readable program code means for selecting a subset of the sequence of changes;

computer readable program code means for causing the document to be displayed on a monitor with the subset of the sequence of changes;

computer readable program code means, in response to user inputs, for selecting and undoing changes in the subset of the sequence of changes displayed on the monitor irrespective of the sequence in which the changes to the initial text of the document were made;

computer readable program code means for implementing changes in the sequence of changes which are not selected and undone so as to provide an edited document; and computer readable program code means for displaying and storing the edited document and the selected changes undone so that the stored document has text corresponding to the undone changes along with the remaining plurality of changes.

16. A computer program product according to claim 7, wherein the subset of the sequence of changes comprise changes from a generation of changes.

17. A computer program product according to claim 15, wherein the subset of the sequence of changes comprise changes associated with a cursor location in the document.

18. A computer program product according to claim 15, wherein the subset of the sequence of changes comprise changes having a common undo type.

19. A computer program product according to claim 18, wherein the undo types are selected from the groups comprising insertion changes, deletion changes and change changes.

20. A computer program product according to claim 18, wherein the computer readable program code means for selecting a subset of the sequence of changes comprises:

computer readable program code means for obtaining user input as to a common undo type; and computer readable program code means for selecting all of the changes in the sequence of changes having the common undo type.

\* \* \* \* \*